(12) United States Patent
Lam et al.

(10) Patent No.: US 11,373,016 B2
(45) Date of Patent: Jun. 28, 2022

(54) INTERACTIVE INFORMATION SYSTEM WITH MODULAR STRUCTURE

(71) Applicant: Flytech Technology Co., Ltd., Taipei (TW)

(72) Inventors: Tai-Seng Lam, Taipei (TW); Po-Hung Lin, Taipei (TW); Hsuan-Chuan Wang, Taipei (TW); Yong-Shun Kuan, Taipei (TW)

(73) Assignee: Flytech Technology Co., Ltd., Taipei (TW)

( * ) Notice: Subject to any disclaimer, the term of this patent is extended or adjusted under 35 U.S.C. 154(b) by 0 days.

(21) Appl. No.: 16/864,061

(22) Filed: Apr. 30, 2020

(65) Prior Publication Data

US 2021/0342494 A1 Nov. 4, 2021

(51) Int. Cl.
*G06F 1/16* (2006.01)
*G06F 3/041* (2006.01)
(Continued)

(52) U.S. Cl.
CPC .............. *G06F 30/12* (2020.01); *G06F 1/16* (2013.01); *G06F 1/1601* (2013.01); *G06F 1/169* (2013.01); *G06F 1/1624* (2013.01); *G06F 1/1632* (2013.01); *G06F 1/1637* (2013.01); *G06F 1/1656* (2013.01); *G06F 1/1683* (2013.01); *G06F 3/04842* (2013.01); *G06F 3/04883* (2013.01); *G06F 30/39* (2020.01);
(Continued)

(58) Field of Classification Search
CPC ........ G06F 1/1632; G06F 1/16; G06F 1/1601; G06F 1/1624; G06F 1/1637; G06F 1/1656; G06F 1/183; G06F 1/266; G06F 1/1684; G06F 3/0416; G06F 3/0412; G06F 3/041; G06F 3/1446; G06F 3/1431; G06Q 20/20
See application file for complete search history.

(56) References Cited

U.S. PATENT DOCUMENTS 7,289,315 B2 * 10/2007 Hillman ................ F16M 11/10
361/679.55
9,129,274 B1 * 9/2015 Mocko ............... F16M 11/2014
(Continued)

OTHER PUBLICATIONS

Office Action issued in corresponding TW Application No. 11011495 dated Jan. 17, 2022 (9 pages).

*Primary Examiner* — Dismery Mercedes
(74) *Attorney, Agent, or Firm* — Osha Bergman Watanabe & Burton LLP

(57) ABSTRACT

An interactive information system is disclosed. The interactive information system includes (i) an interactive module arranged in a first frame including a display module displaying a graphic user interface (GUI), a touch input module receiving a user input to the GUI, and an interactive module bridge board transmitting inter-frame signals including electrical signals of the display module and the touch input module, (ii) a control module arranged in a second frame to generate the GUI and to perform a function of the interactive information system based on the user input, and (iii) an internal cable connecting the interactive module bridge board and the control module to transmit inter-frame signals between the first frame and the second frame. The internal cable is further to transmit power to the interactive module bridge board which transmits power to the display module and the touch input module.

18 Claims, 6 Drawing Sheets

(51) Int. Cl.
*G06Q 20/20* (2012.01)
*G06F 30/12* (2020.01)
*G06F 30/39* (2020.01)
*G06F 3/04883* (2022.01)
*G06F 3/04842* (2022.01)
*G06F 115/12* (2020.01)
*G06F 113/16* (2020.01)
*F16M 11/08* (2006.01)
*F16M 11/18* (2006.01)
*G06F 1/26* (2006.01)
*G06F 3/147* (2006.01)

(52) U.S. Cl.
CPC ............ *G06Q 20/20* (2013.01); *F16M 11/08* (2013.01); *F16M 11/18* (2013.01); *G06F 1/266* (2013.01); *G06F 3/147* (2013.01); *G06F 2113/16* (2020.01); *G06F 2115/12* (2020.01)

(56) References Cited

U.S. PATENT DOCUMENTS

| | | | |
|---|---|---|---|
| 9,520,035 B2 * | 12/2016 | Wang | G06F 1/184 |
| 10,937,013 B2 * | 3/2021 | Hicks | G06K 7/0004 |
| 2008/0055189 A1 * | 3/2008 | Wilk | G06F 3/1431 345/1.3 |
| 2008/0259542 A1 * | 10/2008 | Juan | G06F 1/1601 361/679.24 |
| 2011/0163999 A1 * | 7/2011 | Lin | G06F 1/1601 200/310 |
| 2011/0240379 A1 * | 10/2011 | Forshaw | G01G 19/44 177/1 |
| 2012/0127103 A1 | 5/2012 | Qualey et al. | |
| 2013/0027618 A1 * | 1/2013 | Chen | F16M 11/2092 348/836 |
| 2013/0155595 A1 * | 6/2013 | Herring | G07G 1/0018 361/679.21 |
| 2013/0314300 A1 * | 11/2013 | Moscovitch | G06F 3/1431 345/1.3 |
| 2015/0192956 A1 * | 7/2015 | Whorton | G06F 1/1632 361/679.43 |
| 2015/0227177 A1 * | 8/2015 | McKean | G06F 1/1626 361/679.4 |
| 2015/0286252 A1 * | 10/2015 | Barone | G06F 13/4081 710/304 |
| 2021/0070450 A1 * | 3/2021 | Shah | B64D 11/00152 |

* cited by examiner

INTERACTIVE INFORMATION SYSTEM WITH MODULAR STRUCTURE

BACKGROUND

An interactive information system is a computer terminal with specialized hardware and software that provides access to information and applications for communication, commerce, entertainment, education, medical service, or other remote functionalities.

Universal Serial Bus (USB) is an industry standard that establishes specifications for cables/connectors and protocols for connection, communication, and power supply between computers, peripheral devices and other computers. Released in 1996, the USB standard is maintained by the USB implementers Forum (USB-IF).

DisplayPort is the high-performance external audio/visual (A/V) interface developed and deployed by the personal computer industry through collaboration within Video Electronics Standards Association (VESA), providing display resolutions of 4K and beyond. Like DisplayPort, embedded display port (eDP) also offers display resolutions beyond 4K. Designed to replace the internal low-voltage differential signaling (LVDS) display interface developed in the mid-1990s, eDP is used in computers with an internal display, including laptops, all-in-ones, and many high-end, higher-resolution tablets.

SUMMARY

In general, in one aspect, the invention relates to an interactive information system. The interactive information system includes (i) a first frame, (ii) a first interactive module arranged in the first frame and including a first display module configured to display a graphic user interface (GUI) of the interactive information system, a first touch input module configured to receive a first user input to the GUI, and a first interactive module bridge board configured to transmit a plurality of inter-frame signals comprising electrical signals of the first display module and the first touch input module, (iii) a second frame, (iv) a control module arranged in the second frame and configured to generate the GUI and to perform a function of the interactive information system based on the first user input, and (v) a first internal cable connecting the first interactive module bridge board and the control module and configured to transmit the plurality of inter-frame signals between the first frame and the second frame. The first internal cable is further configured to transmit power to the first interactive module bridge board, and the first interactive module bridge board is configured to transmit power to the first display module and the first touch input module.

In general, in one aspect, the invention relates to an interactive information system. The interactive information system includes (i) a first frame, (ii) an interactive module arranged in the first frame and including a display module configured to display a GUI of the interactive information system, a touch input module configured to receive a first user input to the GUI, and an interactive module bridge board configured to transmit a plurality of inter-frame signals comprising electrical signals of the display module and the touch input module, (iii) a second frame, (iv) a control module arranged in the second frame and including a logic module configured to generate the GUI and to perform a function of the interactive information system based on the first user input, at least one user input device configured to receive a second user input, and a control module bridge board configured to transmit a plurality of intra-frame signals comprising electrical signals of the at least one user input device, (v) a first internal cable connecting the interactive module bridge board and the logic module and configured to transmit the plurality of inter-frame signals between the first frame and the second frame, and (vi) a second internal cable connecting the control module bridge board and the logic module and configured to transmit the plurality of intra-frame signals within the control module. The interactive module and the control module are electrically coupled via only the first internal cable as a single electrical cable.

Other aspects of the invention will be apparent from the following description and the appended claims.

DETAILED DESCRIPTION

Figure 1:
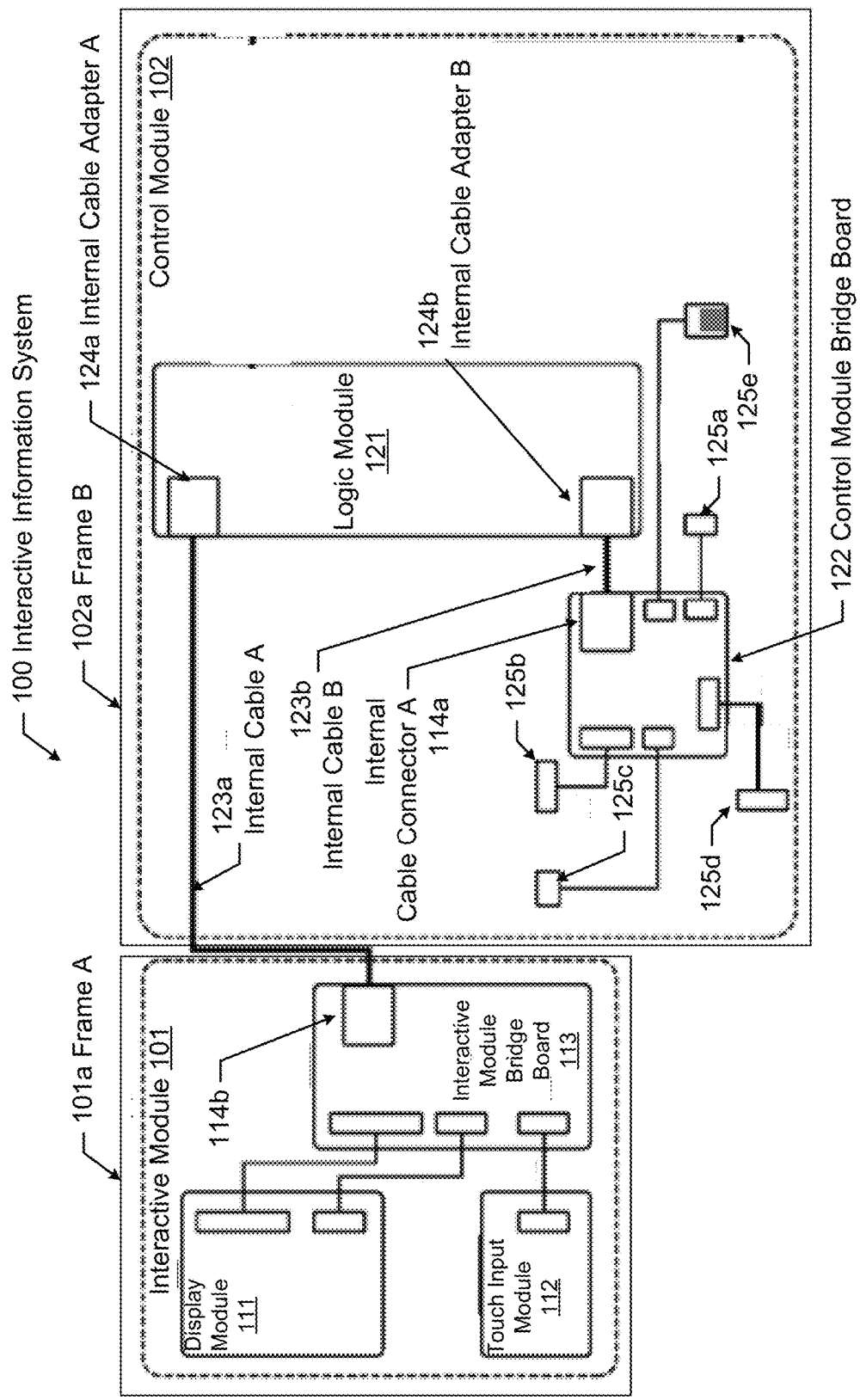
FIG. 1 shows a schematic block diagram of a system in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

An interactive information system normally integrates a variety of components, hardware or peripheral devices. Numerous different cables connecting various components, hardware or peripheral devices often are disorganized and cause additional labor cost and inefficiency to manufacture, maintain, assemble or disassemble the interactive information system. In general, embodiments of the invention provide a system and associated components to perform functionalities of an interactive information system. In one or more embodiments, the system includes an interactive module and a control module that are electrically coupled via a single internal cable, referred to as the first internal cable. In one or more embodiments, the interactive module is arranged in a first frame and control module is arranged in a second frame, and the first frame and the second frame are mechanically coupled to each other using one or more suitable mechanism into an integrated assembly. In one or more embodiments, the first internal cable transmits electrical signals and power connections between the interactive module and the control module. In one or more embodiments, the interactive module includes an interactive module bridge board that consolidates and/or converts electrical signals and power connections of multiple components within the interactive module into electrical connections within the single first internal cable. The electrical signals and power transmitted by the first internal cable are collectively referred to as inter-frame signals. In one or more embodiments, the control module includes a control module bridge board that consolidates and/or converts electrical signals and power connections of multiple peripheral device components within the control module into electrical connections within another single internal cable, referred to as the second internal cable, for transmitting to the logic module. The electrical signals and power transmitted by the second internal cable are collectively referred to as intra-frame signals. In one or more embodiments, the first internal cable for transmitting the inter-frame signals and the second internal cable for transmitting the intra-frame signals are interchangeable with each other.

FIG. 1 shows an interactive information system (100) in accordance with one or more embodiments. In one or more embodiments, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the interactive information system (100) includes an interactive module (101) and a control module (102) that are electrically coupled to each other via a single internal cable A (123a), referred to as the first internal cable. In one or more embodiments, the interactive module (101) and the control module (102) are arranged in a mechanical frame A (101a) and a mechanical frame B (102a), respectively. The mechanical frame A (101a) and the mechanical frame B (102a) are mechanically coupled to each other, as an integrated assembly, using one or more suitable mechanism in the interactive information system (100). The mechanical frame A (101a) and mechanical frame B (102a) are mechanical housings that provide enclosure for environmental protection and mechanical support for the interactive module (101) and the control module (102). In particular, the combined mechanical enclosure of the mechanical frame A (101a) and mechanical frame B (102a) includes electro-magnetic (EM) shielding material (e.g., metallic contents) to provide EM shielding for the electronic circuits contained in the interactive module (101) and the control module (102). Because of the EM shielding provided by the combined mechanical enclosure of the mechanical frame A (101a) and the mechanical frame B (102a), the first internal cable does not include any EM shielding layer that wraps around individual electrical conductors within the first internal cable. In contrast, an external cable requires an EM shielding layer to wrap around individual electrical conductors within the external cable to provide EM shielding. Details of various components of the interactive information system (100) are described below.

In one or more embodiments of the invention, the interactive module (101) includes a display module (111), a touch input module (112), and an interactive module bridge board (113) that are interconnected with various electrical connection cables.

In one or more embodiments, the display module (111) is an electronic component that is configured to display a graphic user interface (GUI) of the interactive information system (100). In one or more embodiments, the display module (111) is a flat panel display device, such as a liquid crystal display (LCD), light-emitting diode (LED) display, plasma display, electroluminescent display (ELD), organic light-emitting diode (OLED) display, quantum dot light-emitting diode (QLED) display, or any combination of the above.

In one or more embodiments, the touch input module (112) is an electronic and/or mechanical component that is configured to receive a user touch input to the GUI of the interactive information system (100). In one or more embodiments, the touch input module (112) is a touchscreen layered on the top of the display module (111). A user can give input to the interactive information system (100) through simple or multi-touch gestures by touching the screen of the display module (111) with a special stylus or one or more fingers.

In one or more embodiments, the interactive module bridge board (113) is an electronic circuit assembly that is configured to transmit one or more inter-frame signals between the interactive module (101) and the control module (102). For example, the inter-frame signals include electrical signals sent to the display module (111) and electrical signals received from the touch input module (112). In one or more embodiments, the interactive module bridge board (113) includes a printed circuit board, which may be based on a rigid or flexible substrate.

In one or more embodiments, a first interactive module cable connects the display module (111) and the interactive module bridge board (113), e.g., based on the LVDS protocol. In addition, another electrical connection cable may connect the display module (111) and the interactive module bridge board (113) to transmit back light signal(s) and associated electrical power.

In one or more embodiments, a second interactive module cable connects the touch input module (112) and the interactive module bridge board (113), e.g., based on the USB protocol. Alternatively, the second interactive module cable may connect the touch input module (112) to the display module (111), which in turn transmits the signals from the touch input module (112) to the interactive module bridge board (113) through the display module (111). In other words, the touch input module (112) and the interactive module bridge board (113) do not have direct connection and are connected indirectly via the display module (111).

In one or more embodiments of the invention, the control module (102) includes a logic module (121), one or more user devices, and a control module bridge board (122). The logic module (121) and the control module bridge board (122) are electrically coupled via a single internal cable B (123b). The single internal cable B (123b) is referred to as the second internal cable. In one or more embodiments, the user devices include one or more of a power switch (125a), a camera (125b), an audio input device (125c), a scanner (125d), a communication port (125e), or a combination of the above.

In one or more embodiments, the logic module (121) is an electronic component that is configured to generate the GUI of the interactive information system (100) and to perform a function of the interactive information system (100) based on the user input to the GUI and/or user input to one or more of the camera (125b), audio input device (125c), and scanner (125d). In one or more embodiments, the logic module (121) is further configured to access, in response to the user input above, a remote server (not shown) via the communication port (125e) to perform the function of the interactive information system (100). For example, the communication port (125e) may include a network connector or other telecommunication connector according to one or more industry standard.

In one or more embodiments, the logic module (121) is a computer motherboard that contains a central processing unit (CPU) and associated memory to execute computer programs under an operating system, such as Micorsoft Windows®, Google's Android®, Linux®, Apple Computer's iOS®, etc.

In one or more embodiments, the single internal cable A (123a), i.e., the first internal cable, connects the interactive module bridge board (113) (via the internal cable connector B (114b)) and the logic module (121) (via the internal cable adaptor A (124a)) to transmit the inter-frame signals between the interactive module (101) and the control module (102).

In one or more embodiments, the control module bridge board (122) is an electronic circuit assembly that is configured to transmit intra-frame signals between the logic module (121) and the user devices within the control module (102). For example, the intra-frame signals may include electrical signals received from and/or sent to one or more of the power switch (125a), camera (125b), audio input device (125c), scanner (125d), communication port (125e), etc. In one or more embodiments, the control module bridge board (122) includes a printed circuit board, which may be based on a rigid or flexible substrate.

In one or more embodiments, the single internal cable B (123b), i.e., the second internal cable connects the control module bridge board (122) (via the internal cable connector A (114a)) and the logic module (121) (via the internal cable adaptor B (124b)) to transmit the intra-frame signals within the control module (102). In one or more embodiments, the first internal cable and the second internal cable, i.e., the single internal cable A (123a) and the single internal cable B (123b), have identical physical construction and are interchangeable with each other. In one or more embodiments, the inter-frame signals and intra-frame signals transmitted by the first internal cable and/or the second internal cable includes eDP signals, USB signals, an audio signal, or a combination of the above. For example, the LVDS signals of the display module (111) may be converted into eDP signals by the interactive module bridge board (113).

In one or more embodiments, the single internal cable A (123a), i.e., the first internal cable, is configured to transmit power to the interactive module bridge board (113), and the interactive module bridge board (113) is configured to transmit power to the display module (111) and the touch input module (112).

In one or more embodiments, the single internal cable B (123b), i.e., the second internal cable, is configured to transmit power to the control module bridge board (122), and the control module bridge board (122) is configured to transmit power to one or more of the camera (125b), audio input device (125c), scanner (125d), communication port (125e) via the control module bridge board (122).

Figure 2:
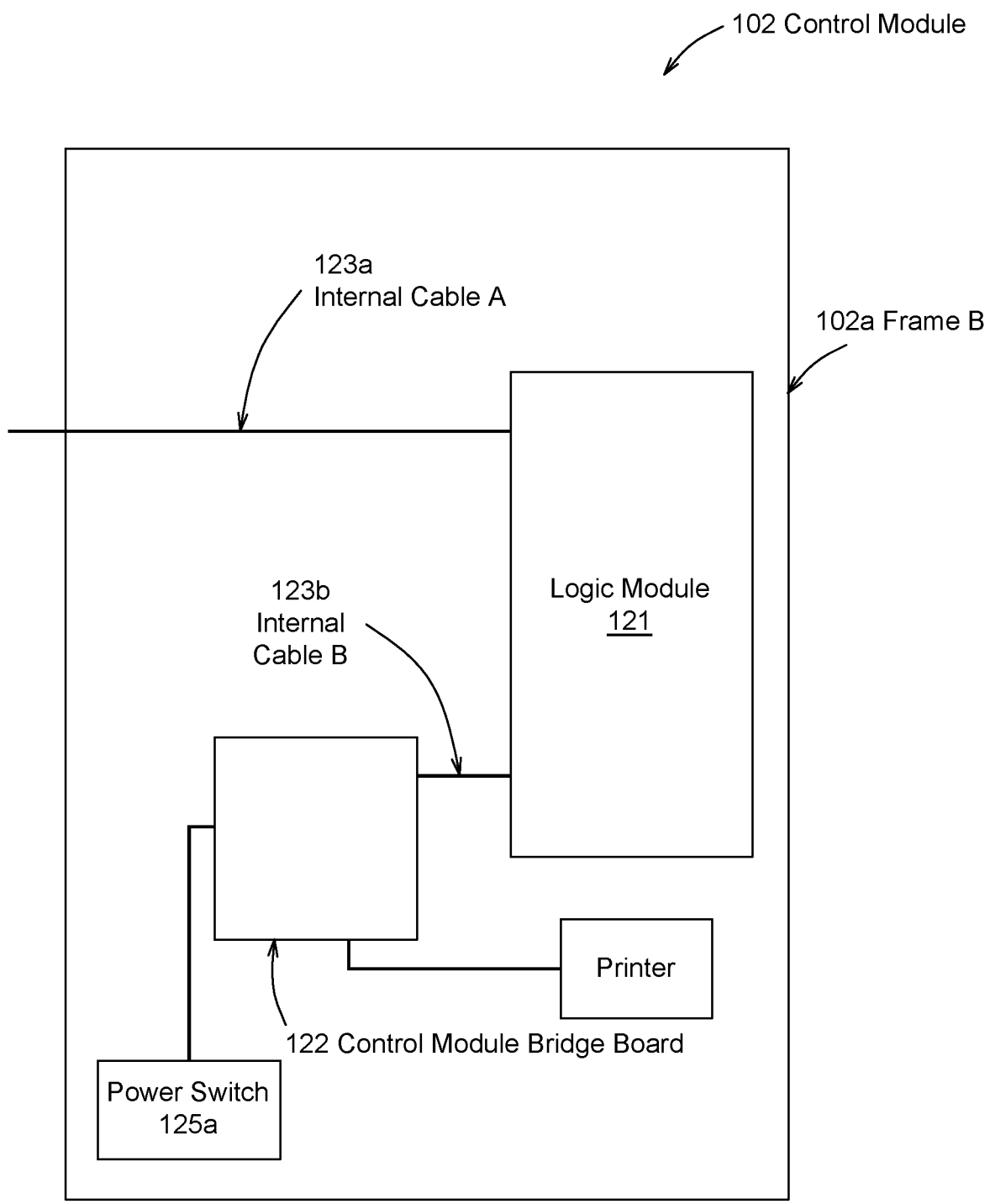
FIG. 2 shows an example in accordance with one or more embodiments of the invention.

FIG. 2 shows an example in accordance with one or more embodiments of the invention. In one or more embodiments, one or more of the modules and elements shown in FIG. 2 may be omitted, repeated, and/or substituted. Accordingly, embodiments of the invention should not be considered limited to the specific arrangements of modules shown in FIG. 2.

Specifically, FIG. 2 shows an example of the control module (102) described above. In particular, as shown in the example, the control module (102) includes the logic module (121) housed within the frame B (102a), may be implemented as a metal enclosure where the internal cable A (123a), internal cable B (123b), and control module bridge board (122) are explicitly labeled. As can be seen, the logic module (121) may be easily removed from the control module (102) after disconnecting the internal cable A (123a) and internal cable B (123b) during a repair process. Additional un-labeled cables connect the control module bridge board (122) to a printer device and a power switch.

Figure 3:
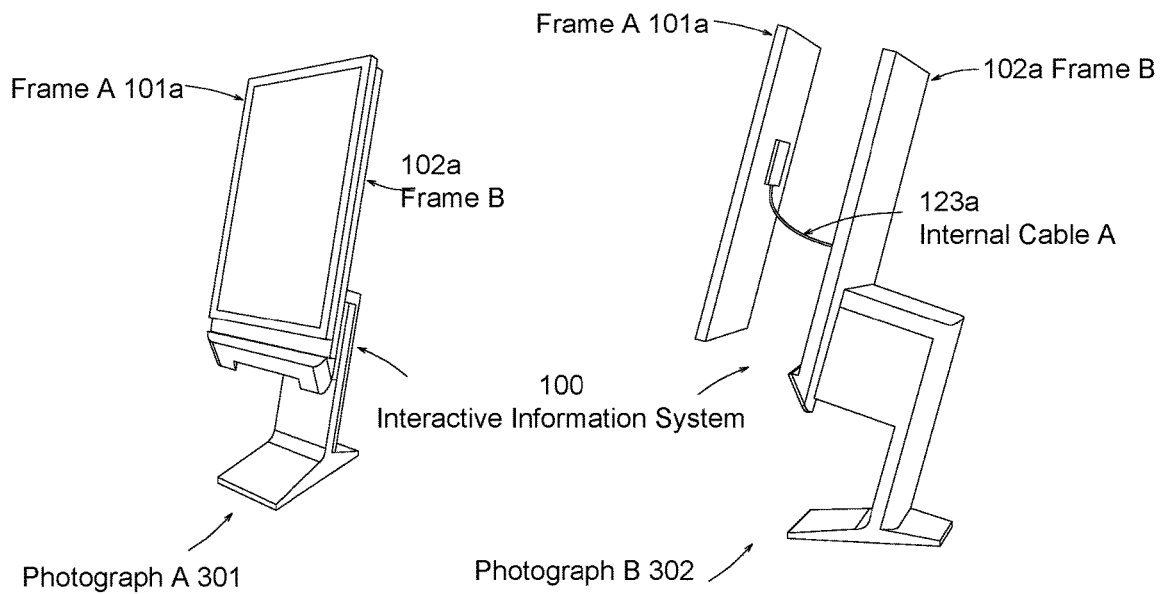
FIG. 3 shows an example in accordance with one or more embodiments of the invention.
Figure 3:
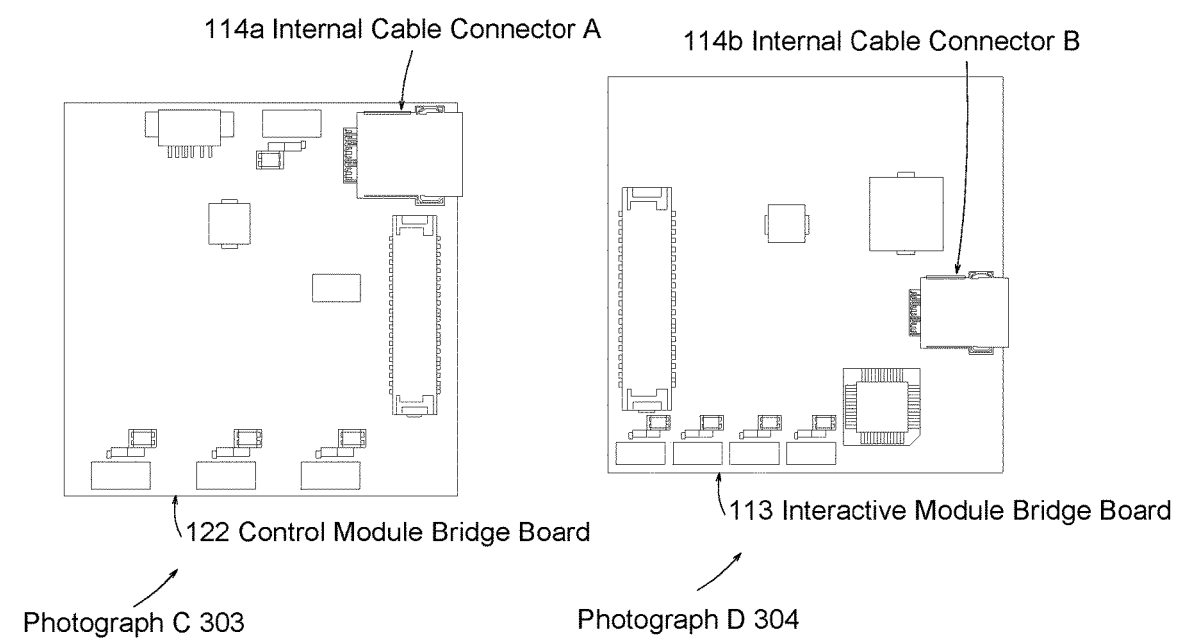

FIG. 3 shows an example in accordance with one or more embodiments of the invention. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

Specifically, FIG. 3 shows photographs of an example of the interactive information system (100) described above. The photograph A (301) and the photograph B (302) show an example of the interactive information system (100), which may be implemented as a kiosk. In this example, the frame A (101a) is mechanically directly coupled to the frame B (102a). In particular, the photograph A (301) shows that the frame A (101a) and the frame B (102a) may be mechanically assembled together by applying a downward sliding action to the frame A (101a) or disassembled by applying an upward sliding action to the frame A (101a). The photograph B (302) shows that the interactive module (101) arranged in the frame A (101a) and the control module (102) arranged in the frame B (102a) are electrically coupled to each other via a single internal cable A (123a). Accordingly, the interactive module (101) and the control module (102) may be electrically disassembled by disconnecting just a single electrical cable. Photograph C (303) shows an example PCB of the control module bridge board (122) where an internal cable connector A (114a) is mounted such that the aforementioned internal cable B (123b) may be inserted to connect to the control module bridge board (122). Photograph D (304) shows an example PCB of the interactive module bridge board (113) where an internal cable connector B (114b) is mounted such that the aforementioned internal cable A (123a) may be inserted to connect to the interactive module bridge board (113). As is seen in Photograph C (303) and Photograph D (304), the internal cable connector A (114a) and the internal cable connector B (114b) have identical physical construction such that the internal cable A (123a) and the internal cable B (123b) may be interchangeable.

Figure 4A:
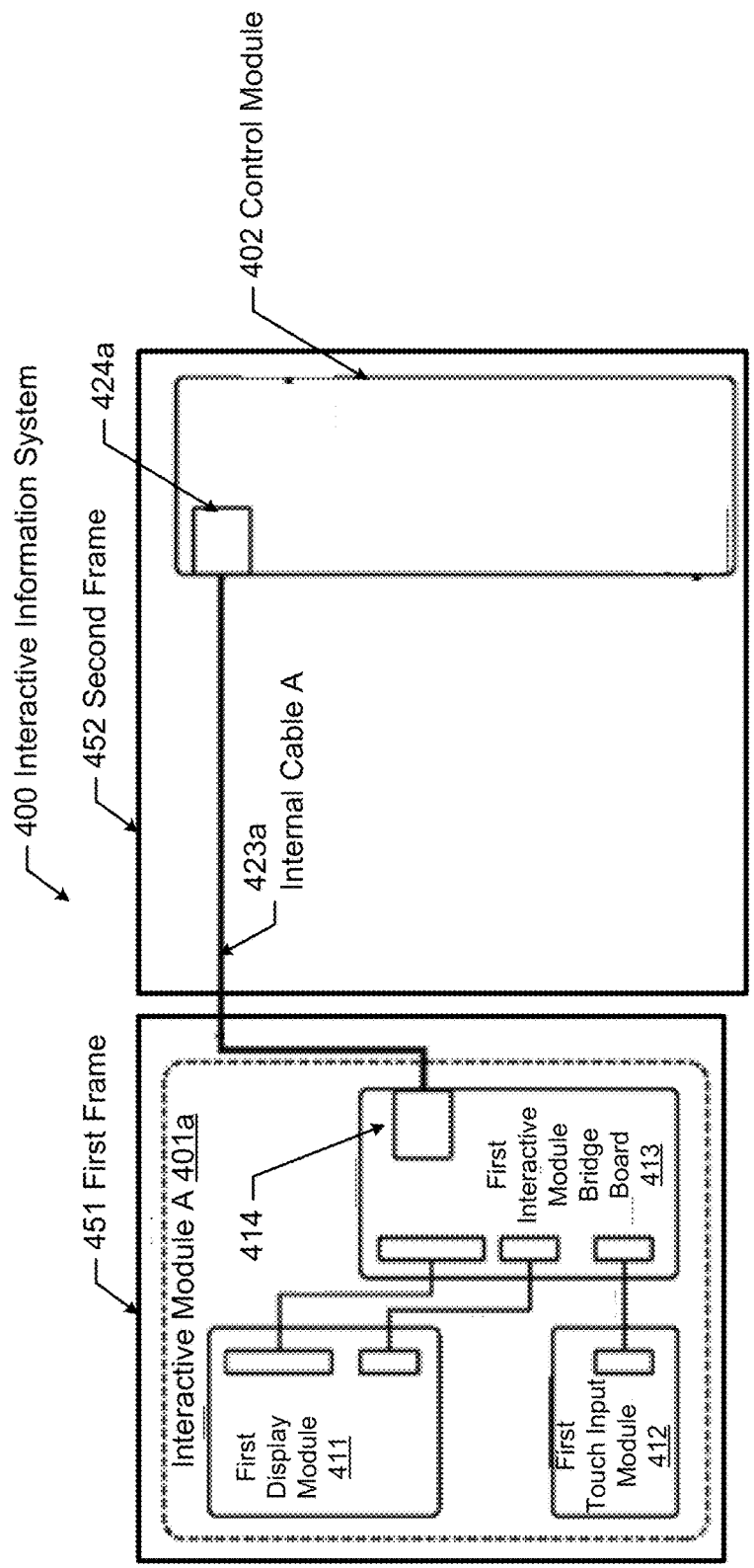
FIG. 4A shows a schematic block diagram of a system in accordance with one or more embodiments of the invention.
Figure 4B:
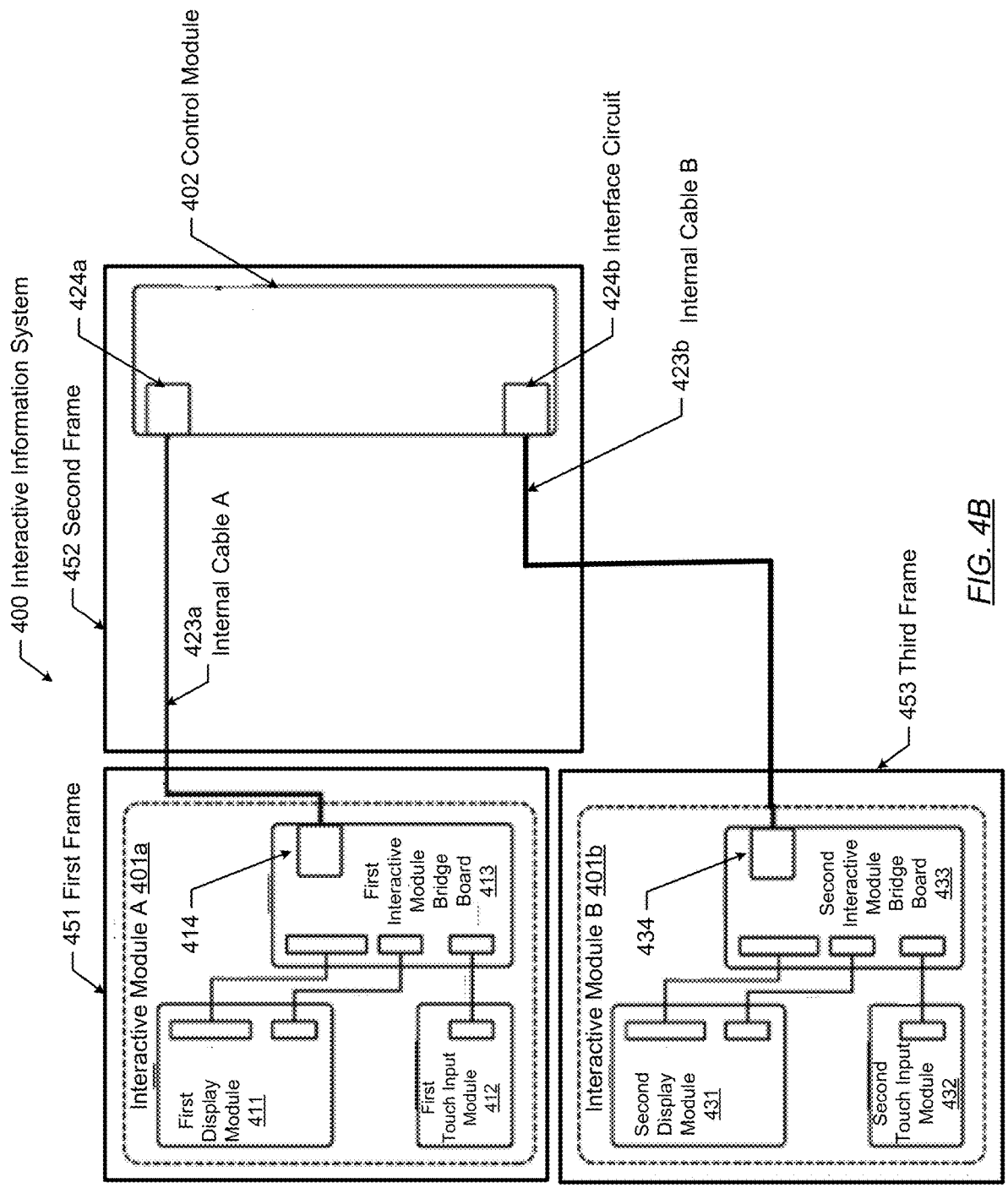
FIG. 4B shows a schematic block diagram of a system in accordance with one or more embodiments of the invention.

FIG. 4A and FIG. 4B show an interactive information system (400) in accordance with one or more embodiments. In one or more embodiments, one or more of the modules and elements shown in FIG. 4A and FIG. 4B may be omitted, repeated, and/or substituted. Accordingly, embodiments of the invention should not be considered limited to the specific arrangements of modules shown in FIG. 4A and FIG. 4B.

As shown in FIG. 4A, in one or more embodiments, the interactive information system (400) includes an interactive module A (401a) and a control module (402) that are electrically coupled to each other via a single internal cable A (423a), referred to as the first internal cable. In the example shown in FIG. 4A, the interactive module A (401a) is an example of the interactive module (101) described in reference to FIG. 1 above. In particular, the first display module (411), the first touch input module (412), and the first interactive module bridge board (413) are examples of the display module (111), the touch input module (112), and the interactive module bridge board (113), respectively, described in reference to FIG. 1 above.

In one or more embodiments, the interactive module A (401a) and the control module (402) are arranged in a first frame (451) and a second frame (452), respectively. The first frame (451) and the second frame (452) are mechanically coupled to each other, as an integrated assembly, using one or more suitable mechanism in the interactive information system (400). The first frame (451) and second frame (452) are mechanical housings that provide enclosure for environmental protection and mechanical support for the interactive module A (401a) and the control module (402). In particular, the single internal cable A (423a) is internal to the combined mechanical enclosure of the first frame (451), the second frame (452), and the one or more mechanical mechanism.

In one or more embodiments, the single internal cable A (423a), i.e., the first internal cable, is configured to transmit power to the first interactive module bridge board (413), and the first interactive module bridge board (413) is configured to transmit power to the first display module (411) and the first touch input module (412).

In one or more embodiments, the single internal cable A (423a) connects the first interactive module bridge board (413) (via an interface circuit (414)) and the control module (402) (via an interface circuit (424a)) to transmit the inter-frame signals between the interactive module A (401a) and the control module (402).

As shown in FIG. 4B, in one or more embodiments, in addition to the interactive module A (401a), the interactive information system (400) further includes an interactive module B (401b) that is also electrically coupled to the control module (402) via a single internal cable B (423b), referred to as the second single internal cable. Similar to the interactive module A (401a), the interactive module B (401b) is an example of the interactive module (101) described in reference to FIG. 1 above. In particular, the second display module (431), the second touch input module (432), and the second interactive module bridge board (433) are examples of the display module (111), the touch input module (112), and the interactive module bridge board (113), respectively, described in reference to FIG. 1 above.

In one or more embodiments, the interactive module B (401b) are arranged in a third frame (453). The single cable B (423b) connects to an interface circuit (424b) of the control module (402). Similar to the first frame (451), the third frame (453) and the second frame (452) are also mechanically coupled to each other, as an integrated assembly, using one or more suitable mechanism in the interactive information system (400). In particular, the single internal cable B (423b) is internal to the combined mechanical enclosure of the third frame (453), the second frame (452), and the one or more mechanical mechanism.

Details of additional components of the interactive information system (400) shown in FIG. 4A and FIG. 4B are described below.

In one or more embodiments of the invention, the interactive module A (401a) includes a first display module (411), a first touch input module (412), and a first interactive module bridge board (413) that are interconnected with various electrical connection cables.

In one or more embodiments, the first display module (411) is an electronic component that is configured to display a graphic user interface (GUI) of the interactive information system (400). In one or more embodiments, the first display module (411) is a flat panel display device, such as a liquid crystal display (LCD), light-emitting diode (LED) display, plasma display, electroluminescent display (ELD), organic light-emitting diode (OLED) display, quantum dot light-emitting diode (QLED) display, or any combination of the above.

In one or more embodiments, the first touch input module (412) is an electronic and/or mechanical component that is configured to receive a user touch input to the GUI of the interactive information system (400). In one or more embodiments, the first touch input module (412) is a touch-screen layered on the top of the first display module (411). A user can give input to the interactive information system (400) through simple or multi-touch gestures by touching the screen of the first display module (411) with a special stylus or one or more fingers.

In one or more embodiments, the first interactive module bridge board (413) is an electronic circuit assembly that is configured to transmit one or more inter-frame signals between the interactive module A (401a) and the control module (402). For example, the inter-frame signals include electrical signals sent to the first display module (411) and electrical signals received from the first touch input module (412). In one or more embodiments, the first interactive module bridge board (413) includes a printed circuit board, which may be based on a rigid or flexible substrate.

In one or more embodiments, a first interactive module cable connects the first display module (411) and the first interactive module bridge board (413), e.g., based on the LVDS protocol. In addition, another electrical connection cable connects the first display module (411) and the first interactive module bridge board (413) to transmit back light signal(s) and associated electrical power.

In one or more embodiments, a second interactive module cable connects the first touch input module (412) and the first interactive module bridge board (413), e.g., based on the USB protocol. Alternatively, the second interactive module cable may connect the first touch input module (412) to the first display module (411), which in turn transmits the signals from the first touch input module (412) to the first interactive module bridge board (413) through the first display module (411). In other words, the first touch input module (412) and the first interactive module bridge board (413) do not have direct connection and are connected indirectly via the first display module (411).

In one or more embodiments of the invention, the control module (402) is a personal computer (i.e., PC box). The control module (402) may include similar components and functionalities as the control module (102) described in reference to FIG. 1 above.

In one or more embodiments of the invention, the interactive module B (401b) arranged in the third frame (453) may include similar components and functionalities as the interactive module A (401a) described above. Specifically, similar to the interactive module A (401a), the interactive module B (401b) may include a second display module (431), a second touch input module (432), and a second interactive module bridge board (433) that are interconnected with various electrical connection cables.

In one or more embodiments, similar to the first display module (411) of the interactive module A (401a), the second display module (431) of the interactive module B (401b) is an electronic component that is configured to display a GUI of the interactive information system (400). In one or more embodiments, the second display module (431) is a flat panel display device, such as a liquid crystal display (LCD), light-emitting diode (LED) display, plasma display, electroluminescent display (ELD), organic light-emitting diode (OLED) display, quantum dot light-emitting diode (QLED) display, or any combination of the above.

In one or more embodiments, similar to the first touch input module (412) of the interactive module A (401a), the second touch input module (432) of the interactive module B (401b) is an electronic and/or mechanical component that is configured to receive a user touch input to the GUI of the interactive information system (400). In one or more embodiments, the second touch input module (432) is a touchscreen layered on the top of the second display module (431). A user can give input to the interactive information system (400) through simple or multi-touch gestures by touching the screen of the second display module (431) with a special stylus or one or more fingers.

In one or more embodiments, similar to the first interactive module bridge board (413) of the interactive module A (401a), the second interactive module bridge board (433) of the interactive module B (401b) is an electronic circuit assembly that is configured to transmit one or more inter-frame signals between the interactive module B (401b) and the control module (402). In one or more embodiments, the one or more inter-frame signals include at least electrical signals of the second display module (431) and the second touch input module (432).

In one or more embodiments, the interactive module B (401b) and the control module (402) are electrically coupled to each other via a single internal cable B (423b), referred to as the second internal cable.

In one or more embodiments, the single internal cable B (423b) connects the second interactive module bridge board (433) (via an interface circuit (434)) and the control module (402) (via an interface circuit (424b)) to transmit the inter-frame signals between the interactive module B (401b) and the control module (402). For example, the inter-frame signals include electrical signals sent to the second display module (431) and electrical signals received from the second touch input module (432).

Figure 5:
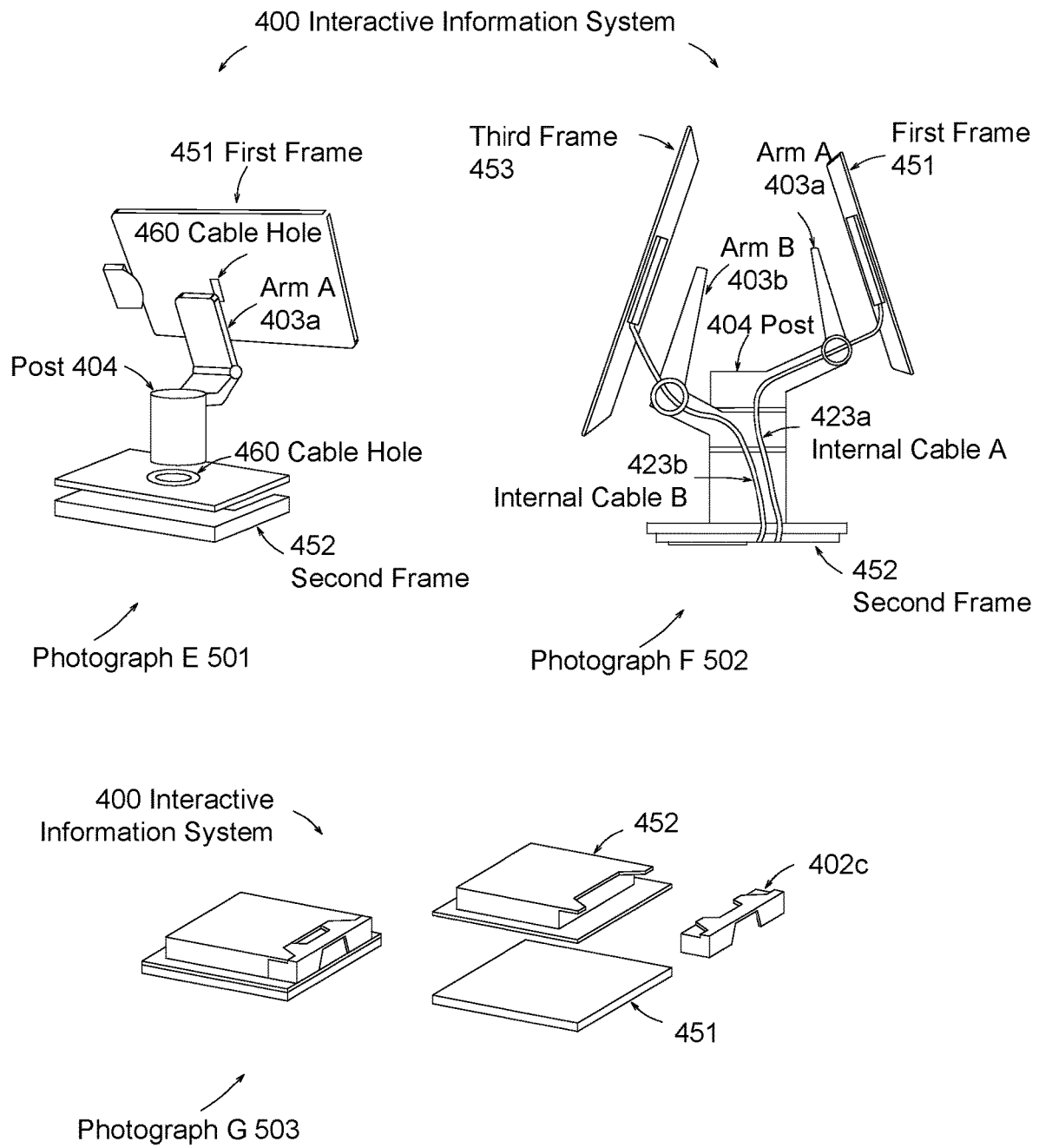
FIG. 5 shows examples in accordance with one or more embodiments of the invention.

FIG. 5 shows an example in accordance with one or more embodiments of the invention. In one or more embodiments, one or more of the modules and elements shown in FIG. 5 may be omitted, repeated, and/or substituted. Accordingly, embodiments of the invention should not be considered limited to the specific arrangements of modules shown in FIG. 5.

Specifically, FIG. 5 shows photographs of examples of the interactive information system (400) described above. The photograph E (501) and the photograph F (502) show an example of the interactive information system (400), which may be implemented as a POS (Point of Sale). In particular, the photograph E (501) shows that the first frame (451) and the second frame (452) are mechanically assembled together via the mechanism of the arm A (403a) extended from the post (404). For example, the arm A (403a) may be an articulating arm that is rotatable around the post (404) such that the interactive module A (401a) may be adjusted by a user for optimum viewing angle. Further, the photograph E (501) shows cable holes (460) on the back side of the first frame (451) and on the top cover of the second frame (452) where the internal cable A (423a) is routed through. While the first frame (451) and the arm A (403a) are shown in the photograph E (501) to be separated by a physical gap for illustration purpose, the opposing surfaces of the first frame (451) and the arm A (403a) are in contact with each other to form the aforementioned EM shielding after final assembly of the interactive information system (400). Similarly, the opposing surfaces of the post (404) and the second frame (452) are also in contact with each other to further form the aforementioned EM shielding after final assembly of the interactive information system (400).

The photograph F (502) shows that the first frame (451) and the second frame (452) are mechanically coupled to each other via the arm A (403a) extended from the post (404), and the interactive module A (401a) and the control module (402) are electrically coupled to each other via the single internal cable A (423a). Accordingly, the interactive module A (401a) and the control module (402) may be electrically disassembled by disconnecting just a single electrical cable. Further, the photograph F (502) also shows that the third frame (453) and the second frame (452) are mechanically coupled to each other via the arm B (403b) extended from the post (404), and the interactive module B (401b) and the control module (402) are electrically coupled to each other via the single internal cable B (423b). Accordingly, the interactive module B (401b) and the control module (402) may be electrically disassembled by disconnecting just a single electrical cable. While the first frame (451) and the arm A (403a) are shown in the photograph F (502) to be separated by a physical gap for illustration purpose, the opposing surfaces of the first frame (451) and the arm A (403a) are in contact with each other to form the aforementioned EM shielding after final assembly of the interactive information system (400). Similarly, the opposing surfaces of the third frame (453) and the arm B (403b) are also in contact with each other to further form the aforementioned EM shielding after final assembly of the interactive information system (400).

The photograph G (503) shows another example of the interactive information system (400), which may be implemented as a panel PC or a tablet computer. In this example, the first frame (451) is mechanically directly coupled to the second frame (452). In particular, the left half of the photograph G (503) shows an assembled panel PC while the right half of the photograph G (503) shows three separate components (i.e., interactive module A (401a) arranged in the first frame (451), control module (402) arranged in the second frame (452), and mechanical mechanism (402c)) of the panel PC prior to final assembly.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An interactive information system, comprising:
a first frame,
a first interactive module arranged in the first frame and comprising:
a first display module configured to display a graphic user interface (GUI) of the interactive information system;
a first touch input module configured to receive a first user input to the GUI; and
a first interactive module bridge board configured to transmit a plurality of inter-frame signals comprising electrical signals of the first display module and the first touch input module;
a second frame,
a control module arranged in the second frame and configured to generate the GUI and to perform a function of the interactive information system based on the first user input; and
a first internal cable connecting the first interactive module bridge board and the control module and configured to transmit the plurality of inter-frame signals between the first frame and the second frame,
wherein the first internal cable is further configured to transmit power to the first interactive module bridge board, and the first interactive module bridge board is configured to transmit power to the first display module and the first touch input module,
wherein a back surface of the first frame and a front surface of the second frame are opposing each other and are in contact with each other through a sliding mechanism,
wherein the interactive module and the control module are electrically coupled via only the first internal cable as a single electrical cable,
wherein the first internal cable is internal to a combined mechanical enclosure of the first frame and the second frame, and
wherein both the first frame and the second frame contain an electro-magnetic (EM) shielding material.

2. The interactive information system of claim 1, the control module further comprising:
a logic module;
at least one user input device configured to receive a second user input;
a control module bridge board configured to transmit a plurality of intra-frame signals comprising electrical signals of the at least one user input device; and
a second internal cable connecting the control module bridge board and the logic module and configured to transmit the plurality of intra-frame signals within the control module.

3. The interactive information system of claim 2, wherein the at least one user input device comprises at least one selected from a group consisting of an audio input device, a camera, a scanner, a printer, and a power switch.

4. The interactive information system of claim 2, wherein the first internal cable and the second internal cable have identical physical construction and are interchangeable with each other.

5. The interactive information system of claim 2, the control module further comprising a communication port,
wherein the control module is further configured to access, in response to the second user input, a remote server via the communication port to perform the function of the interactive information system, and
wherein the control module bridge board is configured to transmit the plurality of intra-frame signals based on a communication signal transmitted via the communication port.

6. The interactive information system of claim 2, wherein the second internal cable is further configured to transmit power to the control module bridge board, and the control module bridge board is configured to transmit power to the at least one user input device.

7. The interactive information system of claim 1, the first interactive module further comprising:
a first interactive module cable connecting the first display module and the first interactive module bridge board; and
a second interactive module cable connecting the first touch input module and the first interactive module bridge board.

8. The interactive information system of claim 1, the first interactive module further comprising:
a first interactive module cable connecting the first display module and the first interactive module bridge board; and
a second interactive module cable connecting the first touch input module and the first display module.

9. The interactive information system of claim 1,
wherein the plurality of inter-frame signals transmitted by the first internal cable comprises a plurality of eDP signals, a plurality of USB signals, and at least one audio signal.

10. An interactive information system, comprising:
a first frame,
an interactive module arranged in the first frame and comprising:
a display module configured to display a graphic user interface (GUI) of the interactive information system;
a touch input module configured to receive a first user input to the GUI; and
an interactive module bridge board configured to transmit a plurality of inter-frame signals comprising electrical signals of the display module and the touch input module;
a second frame,
a control module arranged in the second frame and comprising:
a logic module configured to generate the GUI and to perform a function of the interactive information system based on the first user input;
at least one user input device configured to receive a second user input; and
a control module bridge board configured to transmit a plurality of intra-frame signals comprising electrical signals of the at least one user input device;
a first internal cable connecting the interactive module bridge board and the logic module and configured to transmit the plurality of inter-frame signals between the first frame and the second frame; and
a second internal cable connecting the control module bridge board and the logic module and configured to transmit the plurality of intra-frame signals within the control module, wherein the interactive module and the control module are electrically coupled via only the first internal cable as a single electrical cable, wherein a back surface of the first frame and a front surface of the second frame are opposing each other and are in contact with each other through a sliding mechanism, wherein the first internal cable is internal to a combined mechanical enclosure of the first frame and the second frame, and wherein both the first frame and the second frame contain an electro-magnetic (EM) shielding material.

11. The interactive information system of claim 10, wherein the at least one user input device comprises at least one selected from a group consisting of an audio input device, a camera, a scanner, a printer, and a power switch.

12. The interactive information system of claim 10, the control module further comprising a communication port, wherein the control module is further configured to access, in response to the second user input, a remote server via the communication port to perform the function of the interactive information system, and wherein the control module bridge board is configured to transmit the plurality of intra-frame signals based on a communication signal transmitted via the communication port.

13. The interactive information system of claim 10, wherein the first internal cable is further configured to transmit power to the interactive module bridge board, and the interactive module bridge board is configured to transmit power to the display module and the touch input module.

14. The interactive information system of claim 10, the interactive module further comprising:
   a first interactive module cable connecting the display module and the interactive module bridge board; and
   a second interactive module cable connecting the touch input module and the interactive module bridge board.

15. The interactive information system of claim 10, the first interactive module further comprising:
   a first interactive module cable connecting the display module and the interactive module bridge board; and
   a second interactive module cable connecting the touch input module and the display module.

16. The interactive information system of claim 10, the second internal cable is further configured to transmit power to the control module bridge board, and the control module bridge board is configured to transmit power to the at least one user input device.

17. The interactive information system of claim 10, wherein the first internal cable and the second internal cable have identical physical construction and are interchangeable with each other.

18. The interactive information system of claim 10, wherein the plurality of inter-frame signals transmitted by the first internal cable comprises a plurality of eDP signals, a plurality of USB signals, and at least one audio signal.

* * * * *